(12) United States Patent
Huang

(10) Patent No.: US 9,434,085 B2
(45) Date of Patent: Sep. 6, 2016

(54) CUTTING SYSTEM FOR GLASS SUBSTRATE

(71) Applicant: Shenzhen China Star Optoelectronics Technology Co., Ltd., Shenzhen, Guangdong (CN)

(72) Inventor: Haibo Huang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 273 days.

(21) Appl. No.: 13/980,032

(22) PCT Filed: Jun. 27, 2013

(86) PCT No.: PCT/CN2013/078176
§ 371 (c)(1),
(2) Date: Jul. 16, 2013

(87) PCT Pub. No.: WO2014/194540
PCT Pub. Date: Dec. 11, 2014

(65) Prior Publication Data
US 2014/0352508 A1     Dec. 4, 2014

(30) Foreign Application Priority Data

Jun. 4, 2013  (CN) .......................... 2013 1 0218911

(51) Int. Cl.
*C03B 33/02*     (2006.01)
*C03B 33/03*     (2006.01)
(Continued)

(52) U.S. Cl.
CPC ............... *B26D 7/018* (2013.01); *B26D 1/245* (2013.01); *B26D 7/1863* (2013.01); *B65G 49/068* (2013.01); *C03B 33/03* (2013.01); *C03B 33/033* (2013.01); *B26D 2007/0018* (2013.01);
(Continued)

(58) Field of Classification Search
CPC .......... B26D 1/245; B26D 2007/0018; B26D 7/018; B26D 7/1863; C03B 33/03; C03B 33/033; B65G 2249/045; H01L 21/304; Y10T 225/12; Y10T 225/16; Y10T 225/321; Y10T 225/307; Y10T 225/325; Y10T 225/371; Y10T 225/379; Y10T 225/386; Y10T 83/0453; Y10T 83/207
See application file for complete search history.

(56) References Cited

U.S. PATENT DOCUMENTS 5,297,710 A *  3/1994  Juras .................................. 225/2
8,220,685 B1 *  7/2012  Lindsey et al. .................. 225/93
(Continued)

FOREIGN PATENT DOCUMENTS

CN           1486285 A      3/2004
CN         101734848 A      6/2010

*Primary Examiner* — Stephen Choi
(74) *Attorney, Agent, or Firm* — Andrew C. Cheng

(57) ABSTRACT

A system is provided for cutting a glass substrate that is movably carried on an upstream table. A transferring device is provided for displacing the glass substrate from the upstream table to a downstream table. A cutting device is arranged between the upstream and downstream tables for cutting the glass substrate. A discharging device is arranged between the upstream and downstream tables for removing a leftover of the glass substrate and includes a vacuum pump. A sucking board that has orifices defined thereon is combined with a sucking chamber that is in communication with the orifices and the vacuum pump such that the leftover can be firmly held on the sucking board. A displacing device is interconnected to the sucking board for maneuvering the sucking board to displace the sucking board along with the leftover firmly held thereon.

10 Claims, 4 Drawing Sheets

(51) Int. Cl.
  *B26D 7/01* (2006.01)
  *B26D 1/24* (2006.01)
  *B26D 7/18* (2006.01)
  *C03B 33/033* (2006.01)
  *B65G 49/06* (2006.01)
  *B26D 7/00* (2006.01)

(52) U.S. Cl.
  CPC ...... *B65G2249/045* (2013.01); *Y10T 83/0453* (2015.04); *Y10T 83/207* (2015.04)

(56) References Cited

U.S. PATENT DOCUMENTS

| | | | |
|---|---|---|---|
| 2004/0074366 A1* | 4/2004 | Choo et al. | 83/886 |
| 2004/0212774 A1* | 10/2004 | Yamazaki et al. | 349/187 |
| 2006/0150788 A1* | 7/2006 | Kim | 83/13 |
| 2009/0050610 A1* | 2/2009 | Takamatsu et al. | 219/121.72 |
| 2013/0140338 A1* | 6/2013 | Li et al. | 225/1 |

* cited by examiner

CUTTING SYSTEM FOR GLASS SUBSTRATE

FIELD OF THE INVENTION

The present invention relates to a technological field of liquid crystal display, and more particularly, to a cutting system for glass substrate of the liquid crystal display.

DESCRIPTION OF PRIOR ART

A typical glass substrate generally is configured with upper and lower TFT substrates, a color filter substrate, and liquid crystal between the upper and lower TFT substrates. The furnished glass substrate is tailored to different dimensions according the field requirements. The existing cutting apparatus includes an upper sucking table, and a lower sucking table with upper and lower knifes arranged between gap of the upper and lower sucking tables. A furnished glass substrate is cut on that cutting apparatus.

As shown in FIG. 1, the glass substrate blank 112 is marked with preset cutting line dividing the blank 112 into the unit panel 112a (having larger dimension), and the leftover 112b (with smaller area). With the help of a transfer robot 111, the glass substrate 112 is moved slowly from the upper sucking table 110 toward the lower sucking table 120. The upper and lower knifes 141, 142 will conduct a cutting process to both the upper and lower TFT substrate and the color filter substrate. The leftover 112b is removed by sucking disks 160. The sucking disks 160 are powered and controlled by a cylinder (no shown in Figure) so as to ensure the sucking disks 160 to work stably and synchronically. However, the dimension of the leftover 112b is comparably small and when it is handled by the sucking disks 160, there isn't enough contact area such that the leftover 112b is exerted with unbalanced handling force. Accordingly, when the leftover 112b is to be served from the unit panel 112a, the leftover 112b tends to slide or jolt causing damages to the unit panel 112a along the cutting edge. In worse case, the unit panel 112a is completely useless.

SUMMARY OF THE INVENTION

In order to over the prior art problem, the present invention provides a cutting system for glass substrate and includes an upstream table for carrying the glass substrate. A downstream table is disposed adjacent to the upstream table with a gap for receiving the unit panel cut from the glass substrate. A transferring device is provided for displacing the glass substrate from the upstream table to the downstream table. A cutting device is arranged between the upstream and downstream tables, and includes an upper knife and a lower knife suitable conducting cutting strokes with respect to the glass substrate from above and below.

The apparatus further includes a discharging device arranged between the upstream and downstream tables for removing a leftover of the glass substrate, the discharging device includes a vacuum pump. A sucking board is included and has orifices defined thereon, and interconnected with a sucking chamber from a bottom thereof, wherein the sucking chamber is in communication with the orifices and the vacuum pump such that the leftover can be firmly held onto the sucking board. And a displacing device is interconnected to the sucking board for maneuvering the sucking board so as to displace the sucking board along with the leftover firmly held thereon.

Preferably, wherein a side of the sucking board is interconnected to a front end of the upstream table such that the sucking board can be maneuvered centered on the upstream table.

Preferably, wherein the sucking board is hinged to the upstream table.

Preferably, wherein the discharging device includes at least a driving mechanism having a robot arm mounted thereon, and which is interconnected to the sucking board, wherein with the maneuvering of the driving mechanism, the sucking board is rotated by the robot arm.

Preferably, further includes a collecting bin for storing the leftover discharged from the sucking board.

Preferably, further includes a monitor center interconnected to the discharging device so as to monitor the discharging process performed by the discharging device.

The present invention further provides a cutting method utilizing the cutting system described above to conduct the cutting of the glass substrate. The method includes the following steps.

S1: advancing a glass substrate marked with a plurality of unit panels and a plurality of leftovers with cutting lines by the transferring device from the upstream table to the downstream table in a way such that the leftover in the upfront is in aligned with the discharging device;

S2: aligning the upper and lower knifes with the cutting lines to conduct a cutting;

S3: actuating the vacuum pump to create a vacuum environment on a surface of the sucking board accompanied with a sucking chamber so as to hold the leftover firmly on the surface of the sucking board; rotating the sucking board by means of the displacing device so as to separate the leftover and the adjacent unit panel;

S4: advancing the glass substrate toward the downstream table such that the unit panel is in align with the downstream table, and then separating with the leftover behind the unit panel; and Repeating steps S1~S4 several times.

Preferably, wherein a side of the sucking board is interconnected to a front end of the upstream table such that the sucking board can be maneuvered centered on the upstream table.

Preferably, wherein the sucking board is hinged to the upstream table.

Preferably, wherein the discharging device includes at least a driving mechanism having a robot arm mounted thereon, and which is interconnected to the sucking board, wherein with the maneuvering of the driving mechanism, the sucking board is rotated by the robot arm.

Preferably, further includes a collecting bin for storing the leftover discharged from the sucking board.

The present invention provides an additional discharging device in the cutting system for glass substrate. A vacuum is created to hold up the leftover so as to directly sever the leftover from with the unit panel of the glass substrate. On the other hand, with the help of the robot arm, the sucking board can readily conduct a swing or transversal movement so as to ensure the correct and stable operation of the sucking board in both angle as well as speed. In addition, since the leftover is securely attached onto the surface of the sucking board through the vacuum, the surface area for contact between the leftover and the sucking board is increased. As a result, the leftover is exerted with even severing force. Because the leftover is securely held by the sucking board, once it is severed, the leftover will not create any unwanted and unnecessary contact with the unit panel so as to prevent the later from being damaged or scratched. Therefore, the quality of the unit panel is ensured.

DETAILED DESCRIPTION OF PREFERRED EMBODIMENT

Detailed description will be given in view of preferred embodiments along with the accompanied drawings.

Figure 1:
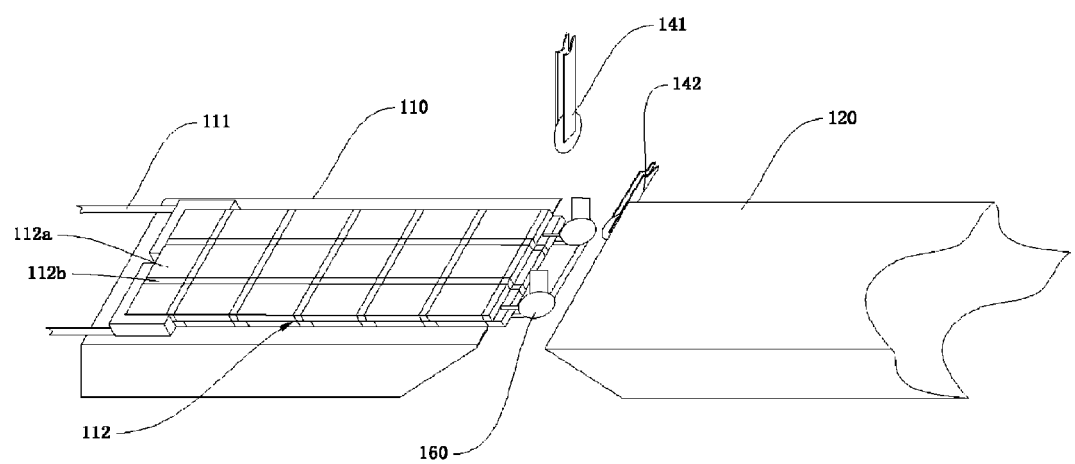
FIG. 1 is an illustration of a prior art cutting system for glass substrate.
Figure 2:
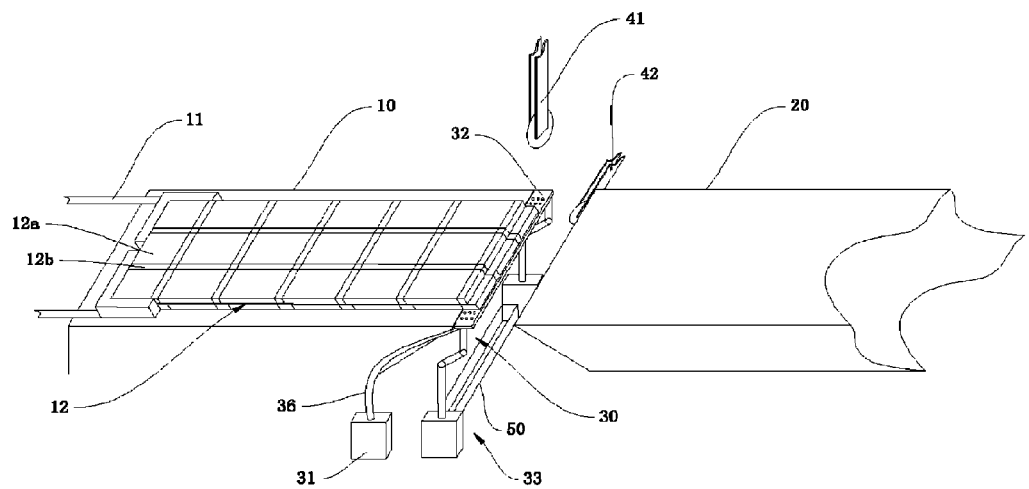
FIG. 2 is an illustrational view of a cutting system for glass substrate made in accordance with a first embodiment of the present invention.

As shown in FIG. 2, a cutting system made in accordance with the present invention includes the following components.

An upstream table 10 carries and supports a glass substrate 12 to be severed gradually according to the preset cutting sequences. The glass substrate 12 is configured with an upper and lower TFT substrate, and a color filter substrate laminated together. Before the glass substrate is severed, marked transversal cutting lines (perpendicular to an advancing direction of the glass substrate 12) and longitudinal cutting lines (in parallel to the advancing direction of the glass substrate 12) have been created, dividing the glass substrate 12 into the unit panel 12a (having larger surface area), and a leftover 12b.

A downstream table 20 is arranged next to the upstream table 10 for receiving and supporting the severed glass substrate 12, i.e. the unit panel 12a.

A transferring device 11 is provided and used to advance the glass substrate 12 from the upstream table 10 to the downstream table 20. In order to better description of the preferred embodiment of the present invention, the direction of "front direction" is defined as the advancing direction in which the glass substrate 12 is advanced from the upstream table 10 to the downstream table 20.

The cutting system for cutting glass substrate further includes a cutter system arranged between the upstream table 10 and the downstream table 20, and is configured with an upper knife 41 and a lower knife 42. Both the upper knife 41 and the lower knife 42 can conduct a cutting stroke from above and below of the glass substrate 12. The upstream stable 10 and the downstream table 20 is spaced from each other to provide a gap such that the upper knife 41 and the lower knife 42 extend therein to conduct the cutting strokes along the glass substrate 12 spanned over the gap.

A collecting bin 50 is disposed below the gap arranged between the upstream table 10 and the downstream table 20 so as to collect the leftover 12b severed from the glass substrate 12.

Figure 3:
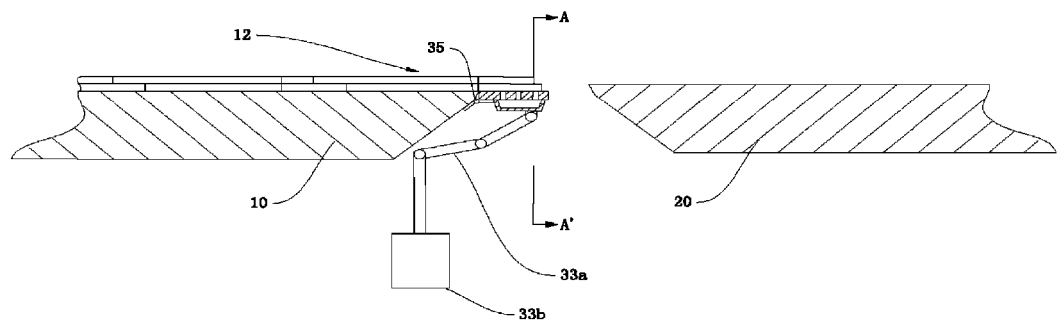
FIG. 3 is a longitudinal cross-sectional view of the cutting system for glass substrate made in accordance with a first embodiment of the present invention.
Figure 4:
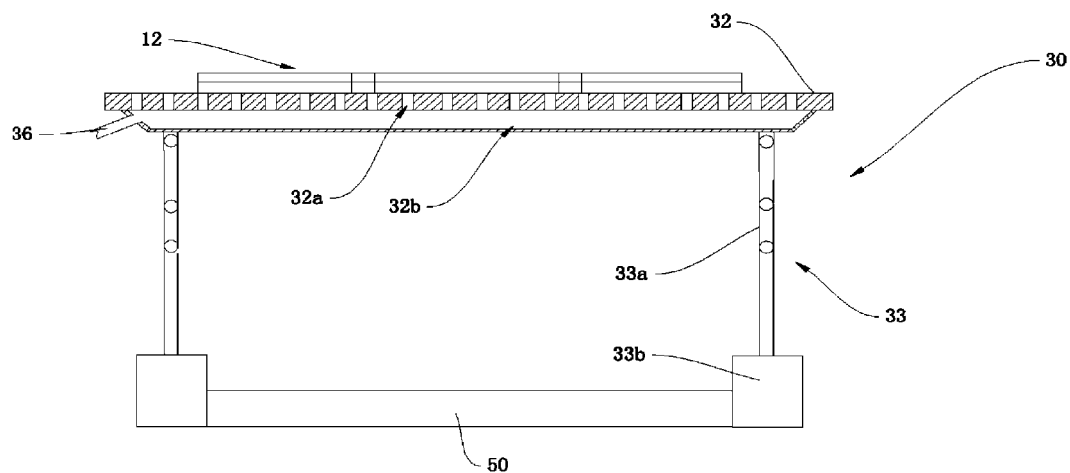
FIG. 4 is a cross-sectional view taken from line A-A' of FIG. 3.

A discharging device 30 is further arranged between the upstream table 10 and the downstream table 20 so as to effectively remove the leftover 12b severed from the glass substrate 12, and which can be readily seen and understood from referring to FIGS. 2, 3 and 4. The discharging device 30 includes the following components.

A vacuum source is included, and it is configured by a vacuum pump 31 according to the preferred embodiment.

A sucking board 32 is provided and has orifices 32a thereon. The sucking board 32 is provided with a sucking chamber 32b which is in communication with the orifices 32a. The vacuum pump 31 is interconnected to the sucking chamber 32b with a conduit 36. When the vacuum pump 31 is operated, a negative pressure, i.e. vacuum is created within the sucking chamber 32b, and the leftover 12b disposed on a surface of the sucking board 32 can be readily held thereon through the orifices 32a. In order to more readily control the operation of the sucking board 32, the sucking board 32 is hinged to the upstream table 10, i.e. a rear end of the sucking board 32 is pivotally connected to a front end of the upstream table 10 by means of a hinge 35. Accordingly, the sucking board 32 can readily swing as centered on the front end of the upstream table 10 within a predetermined angular area. Once the sucking board 32 is swung, the leftover 12b firmly held thereon is severed from the glass substrate 12.

In order to readily control the timing and scope of the angular movement of the sucking board 32, a displacing device 33 is interlinked to the sucking board 32 so as to maneuver the sucking board 32 to sever the leftover 12b, and further displace the severed leftover 12b. The displacing device 33 includes at least a driving linkage 33b with a robot arm 33a thereon. The robot arm 33a is interlinked to the sucking board 32. By the operation of the driving linkage 33b, the sucking board 32 can be readily operated by the robot arm 33a.

The operational sequences of the cutting process by the cutting system for the glass substrate will be detailed elaborated herebelow.

Figure 5:
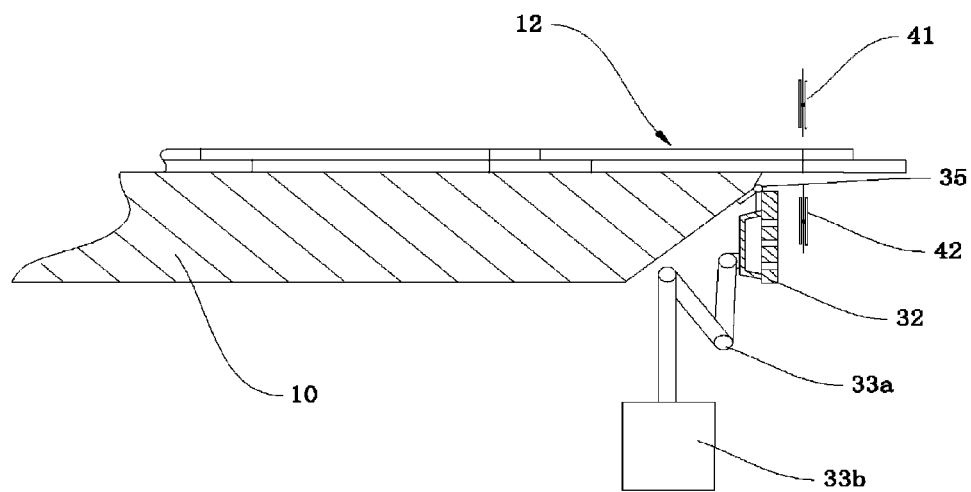
FIG. 5 is partial view illustrating the operation of the discharging device in accordance with the cutting system for glass substrate made in accordance with a first embodiment of the present invention.

S1: Feeding. Referring to FIG. 5, the glass substrate 12 marked with the unit panel 12a and the leftover 12b is placed onto the upstream table 10 by means of a transferring device (not shown in FIG. 5), and the glass substrate 12 is advanced slowly from the upstream table 10 to the downstream table 20. Meanwhile, the robot arm 33a will be maneuvered to swing the sucking board 32 downward and closer to a front side of the upstream table 10.

S2: Severing. While the leftover 12b in the upfront extends beyond the front end of the upstream table 10 gradually, once the first transversal cutting line cross the front end of the upstream table 10, the transferring device 11 is stopped and the glass substrate 12 is held firmly. Then, the upper knife 41 and the lower knife 42 are aligned with the cutting line and conduct a cutting stroke to the glass substrate 12, respectively from above and below.

Figure 6:
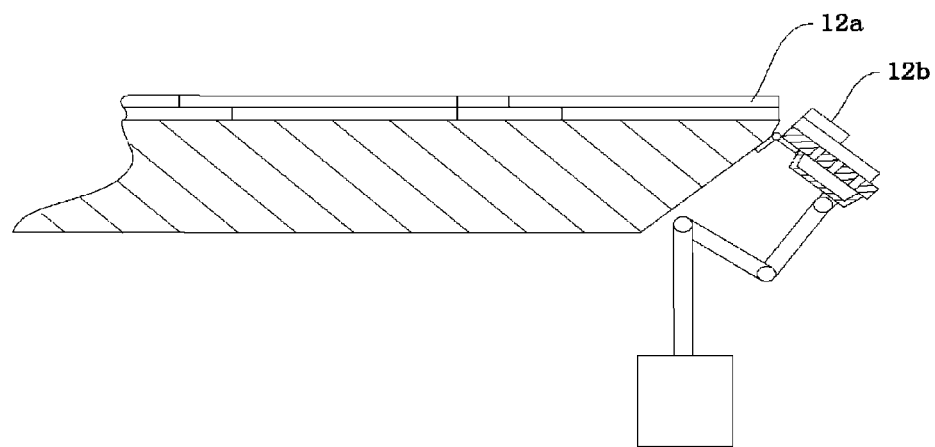
FIG. 6 is similar to FIG. 5, illustrating the operation of the discharging device in accordance with the cutting system for glass substrate made in accordance with a first embodiment of the present invention.

S3: Severance of the leftover 12b. After the cutting strokes of the upper and lower knifes 41, 42 are completed, the cutters 41, 42 are retrieved to their original position. However, the leftover 12b will not automatically separated from the glass substrate 12, and external force has to be applied to finally sever the leftover 12b from the glass substrate 12. Please referring to FIG. 6, the driving linkage 33b is triggered, and the robot arm 33a is swung to rotate counterclockwise such that the sucking board 32 is flushed to the top surface of the upstream table 10 and the leftover 12b is right above the sucking board 32. Meanwhile, the vacuum pump 31 is also triggered so as to create a vacuumed environment to the sucking chamber 32b. Once the vacuumed environment in the sucking chamber 32b is created, the leftover 12b is properly held on the sucking board 32 by the vacuum of the sucking chamber 32b through the orifices 32a. Referring to FIG. 3, then the robot arm 33a will be triggered to rotate the sucking board 32 clockwise and gradually close to the front side of the upstream table 10. During the angular movement of the sucking board 32, the leftover 12b is severed from the unit panel 12a as the glass substrate 12 deform along the cutting line. The robot arm 33a will keep rotating clockwise to further displace the sucking board 32, and eventually the sucking board 32 will be in align with the collecting bin 50. Then the vacuum pump 31 will be paused, and the vacuum environment within the sucking chamber 32b will be resumed to the ambient pressure and the leftover 12b will slide into the collecting bin 50 as the leftover 12b loses its hold on the sucking board 32. As a result, the severance and discharging of the leftover 12b can be readily completed through a single movement of the sucking board 32.

S4: Severance of the unit panel 12a. Once the first or the upfront leftover 12b is severed and removed, the transferring device 11 is turned on again to advance the glass substrate 12 toward the downstream table 20. With the advancement of the glass substrate 12 toward the downstream table 20, the unit panel 12a starts to cross over the gap and leaves the upstream table 10 and reaches to the downstream table 20. Once the front cutting line on the lower surface of the glass substrate 12 crosses over the front end of the upstream table 10, the transferring device 11 is held up, and the upper and lower knives 41, 42 are extended to conduct the cutting strokes again to separate the unit panel 12a. Once the unit panel 12a is severed, a pickup device (not shown in the Figure) located above the downstream table 20 will pick up the unit panel 12a so as to sever the leftover 12b next to the unit panel 12a.

The steps S1~S4 can be readily and conveniently repeated till all the unit panels 12a and the leftovers 12b are separated. In order to properly control the overall cutting and discharging process, a monitor center (not shown in Figure) can be connected to the discharging device so as to control and modify the operational perimeters, such as the width of the sucking board, vacuum power, displacement stroke and speed of the robot arm. In light of this, by properly input those perimeters, the cutting and severance of the unit panel and the leftover of the glass substrate can be readily done according to the field requirements.

Embodiment 2

Figure 7:
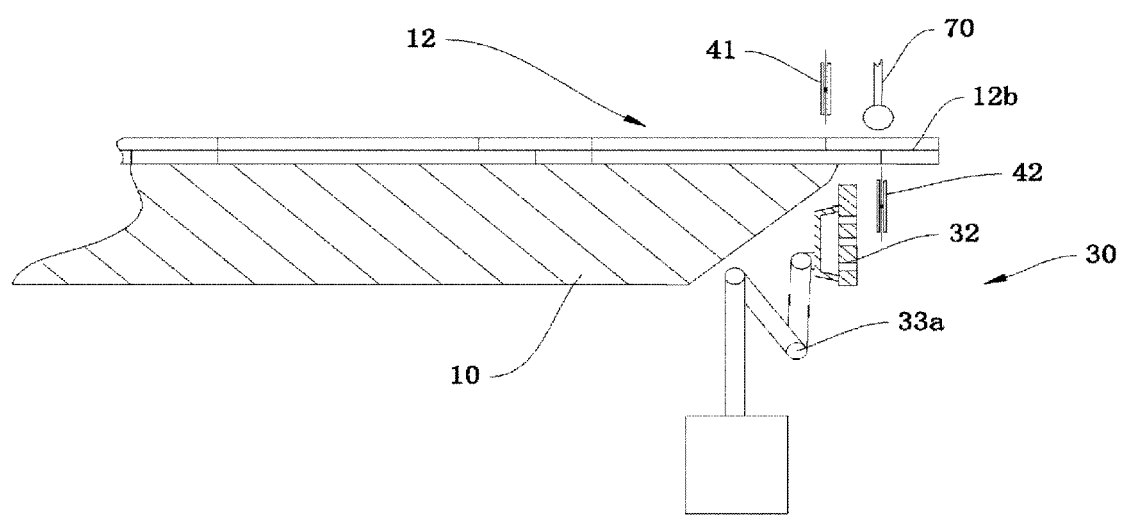
FIG. 7 is a partial view illustrating the operation of the discharging device in accordance with the cutting system for glass substrate made in accordance with a first embodiment of the present invention.

In the current embodiment, as shown in FIG. 7, the sucking board 30 is not interlinked to the front end of the upstream table 10, while it is displaced directly by the movement of the robot arm 33a. Once the sucking board 30 holds up the leftover 12b, it can be moved to separate the leftover 12b from the glass substrate 12 and transfer it to the collecting bin 50 directly.

On the other hand, a roller 70 is arranged above the glass substrate 12 in align with the lower knife 42. By this arrangement, the cutting stroke of the upper knife 41 and the lower knife 42 can be operated in different timing so as to meet different field requirements. For example, the lower knife 42 can proceed the cutting stroke firstly to the color filter substrate of the glass substrate 12 with the roller 70 pressing down the glass substrate 12 for balancing the cutting force applied to the glass substrate 12 by the lower knife 42. The arrangement of the roller 70 can readily protect the glass substrate 12 from being damaged. Once the cutting stroke on the color filter substrate is completed, then the sucking board 30 can be raised to flush with the upstream table 10, and then the upper knife 41 can proceed the cutting stroke to the TFT substrate of the glass substrate 12. Other steps can be referred to the description re the first embodiment.

The present invention provides an additional discharging device in the cutting system for glass substrate. A vacuum is created to hold up the leftover so as to directly sever the leftover from with the unit panel of the glass substrate. On the other hand, with the help of the robot arm, the sucking board can readily conduct a swing or transversal movement so as to ensure the correct and stable operation of the sucking board in both angle as well as speed. In addition, since the leftover is securely attached onto the surface of the sucking board through the vacuum, the surface area for contact between the leftover and the sucking board is increased. As a result, the leftover is exerted with even severing force. Because the leftover is securely held by the sucking board, once it is severed, the leftover will not create any unwanted and unnecessary contact with the unit panel so as to prevent the later from being damaged or scratched. Therefore, the quality of the unit panel is ensured.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A cutting apparatus, comprising:
    an upstream table for carrying a glass substrate comprising a unit panel and a leftover connected to each other;
    a downstream table disposed adjacent to the upstream table with a gap therebetween for receiving the unit panel cut from the glass substrate;
    a transferring device for displacing the glass substrate from the upstream table to the downstream table; and
    a cutting device arranged between the upstream and downstream tables and including an upper knife and a lower knife suitable respectively arranged above and below the glass substrate for conducting cutting strokes with respect to the glass substrate from above and below to partly separate the leftover from the unit panel, wherein the lower knife is located downstream of the upper knife, a roller being arranged above the glass substrate and substantially in alignment with the lower knife;
    wherein the apparatus further includes a discharging device arranged between the upstream and downstream tables for separating the leftover from the unit panel, the discharging device including:
    a vacuum pump;
    a sucking board having orifices defined in a surface thereof on which the leftover is positionable to be in direct contact engagement therewith and interconnected with a sucking chamber arranged at a bottom thereof, wherein the sucking chamber is in communication with the orifices and the vacuum pump that selectively induces a suction force on the surface of the sucking board so as to have the leftover firmly held on the surface of the sucking board; and a displacing device interconnected to the sucking board for maneuvering the sucking board so as to displace the sucking board along with the leftover firmly held thereon to thereby completely separate the leftover from the unit panel, allowing the displacing device to move the leftover away from the unit panel.

2. The cutting system as recited in claim 1, wherein a side of the sucking board is interconnected to a front end of the upstream table such that the sucking board is maneuvered centered on the upstream table.

3. The cutting system as recited in claim 2, wherein the sucking board is hinged to the upstream table.

4. The cutting system as recited in claim 1, wherein the discharging device includes at least a driving mechanism having a robot arm mounted thereon, and which is interconnected to the sucking board, wherein with the maneuvering of the driving mechanism, the sucking board is rotated by the robot arm.

5. The cutting system as recited in claim 1, further including a collecting bin for storing the leftover discharged from the sucking board.

6. A cutting method for cutting a glass substrate by means of a cutting apparatus recited in claim 1, comprising the steps of:

S1: advancing a glass substrate marked with a plurality of unit panels and a plurality of leftovers with cutting lines by the transferring device from the upstream table to the downstream table in a way such that the leftover that is in front of one of the unit panels is aligned with the discharging device;

S2: aligning the upper and lower knives with the cutting lines to conduct cutting with the roller being moved down against the glass substrate;

S3: actuating the vacuum pump to create a vacuum environment on a surface of the sucking board accompanied with the sucking chamber so as to hold the leftover firmly on the surface of the sucking board; and rotating the sucking board by means of the displacing device so as to separate the leftover from the unit panel, allowing the displacing device to move the leftover away from the unit panel;

S4: advancing the glass substrate toward the downstream table such that the unit panel is in alignment with the downstream table and then conducting an operation for separating the unit panel from a remaining portion of the glass substrate; and repeating steps S1-S4.

7. The cutting method as recited in claim 6, wherein a side of the sucking board is interconnected to a front end of the upstream table such that the sucking board is maneuvered centered on the upstream table.

8. The cutting method as recited in claim 6, wherein the sucking board is hinged to the upstream table.

9. The cutting method as recited in claim 6, wherein the discharging device includes at least a driving mechanism having a robot arm mounted thereon, and which is interconnected to the sucking board, wherein with the maneuvering of the driving mechanism, the sucking board is rotated by the robot arm.

10. The cutting method as recited in claim 6, further including a collecting bin for storing the leftover discharged from the sucking board.

* * * * *